Figure 1:
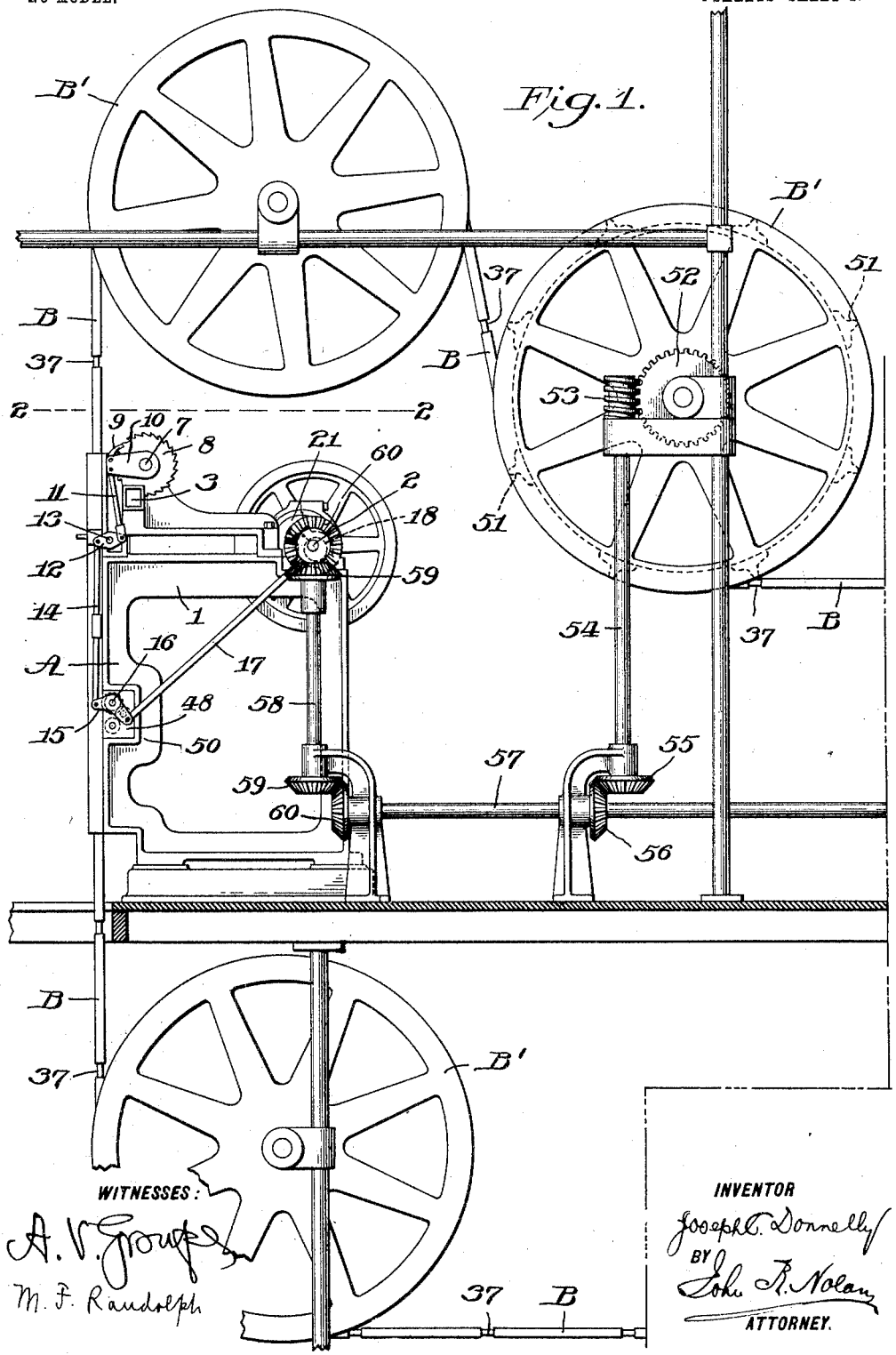

No. 776,648. PATENTED DEC. 6, 1904.
J. C. DONNELLY.
MATCH MAKING MACHINE.
APPLICATION FILED APR. 25, 1903.
NO MODEL. 4 SHEETS—SHEET 1.

WITNESSES:
INVENTOR
Joseph C. Donnelly
BY
John R. Nolan
ATTORNEY.

No. 776,648. PATENTED DEC. 6, 1904.
J. C. DONNELLY.
MATCH MAKING MACHINE.
APPLICATION FILED APR. 25, 1903.
NO MODEL. 4 SHEETS—SHEET 2.
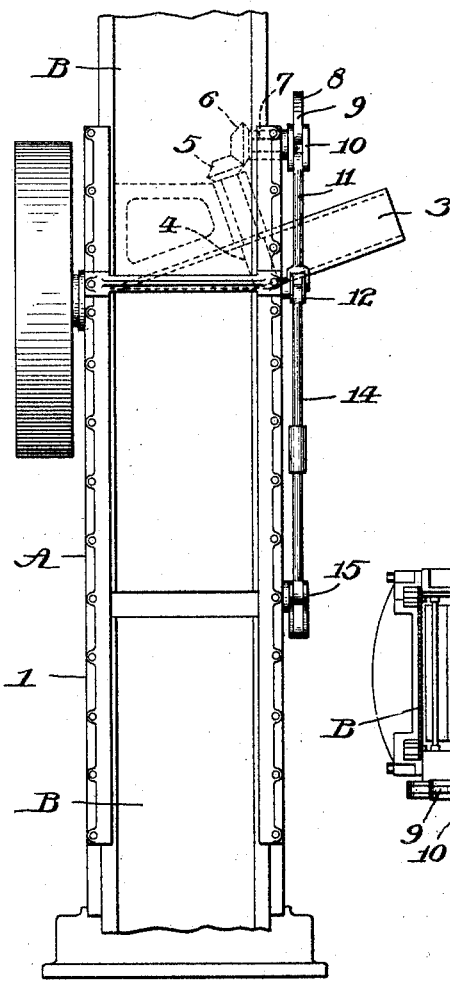
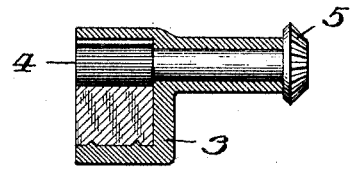
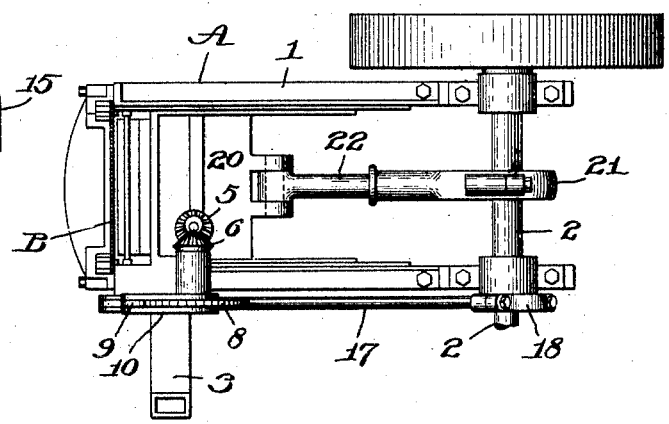
WITNESSES:
INVENTOR
Joseph C. Donnelly
BY
John R. Nolan
ATTORNEY.

No. 776,648. PATENTED DEC. 6, 1904.
J. C. DONNELLY.
MATCH MAKING MACHINE.
APPLICATION FILED APR. 25, 1903.
NO MODEL. 4 SHEETS—SHEET 3.
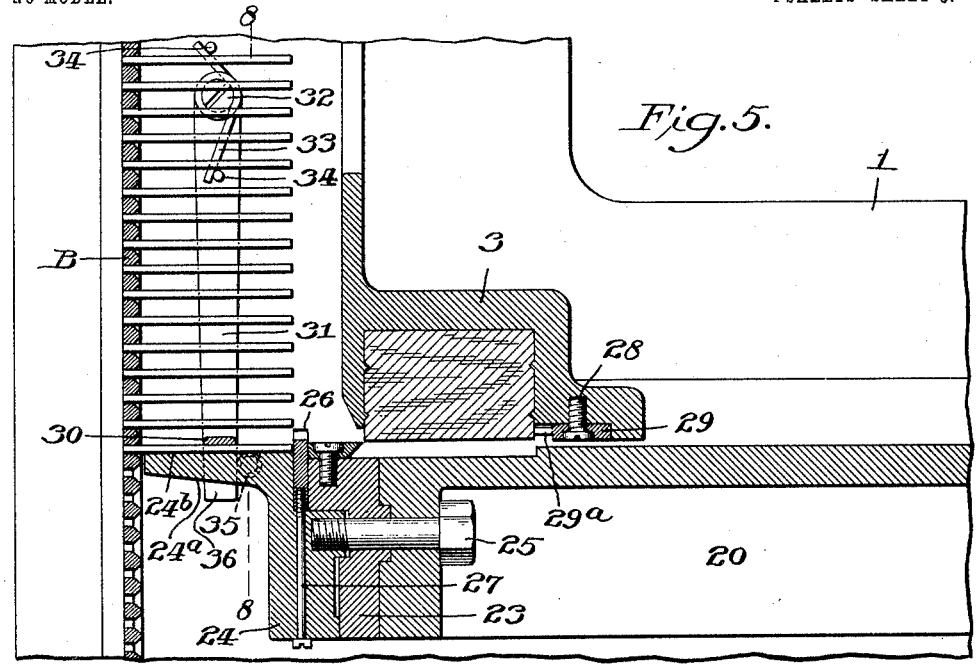
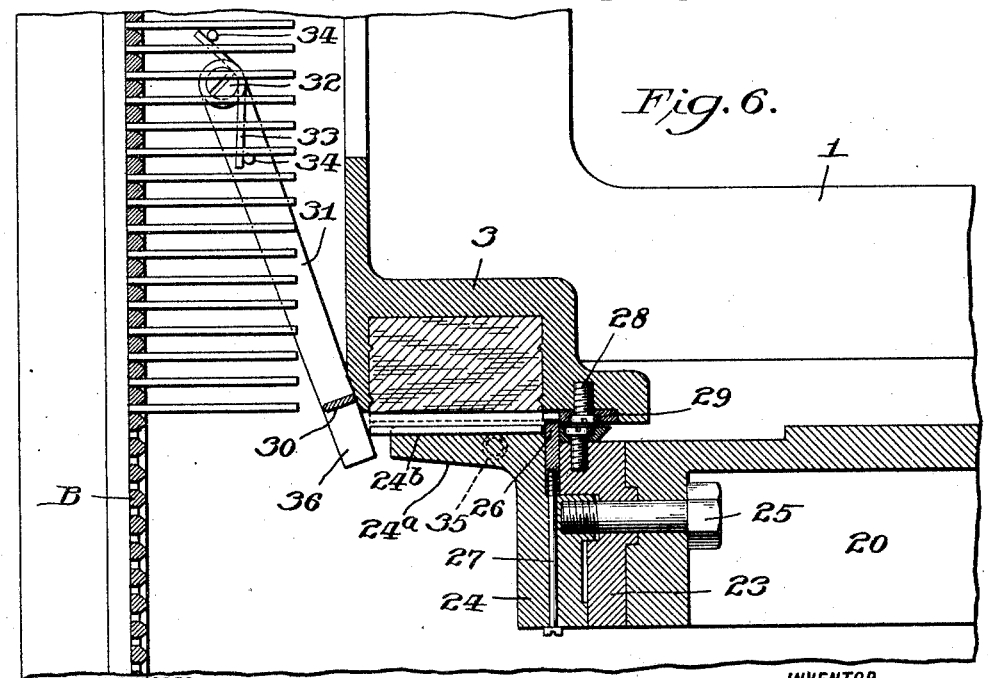
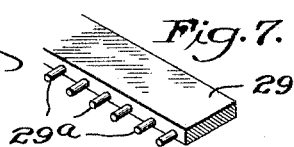

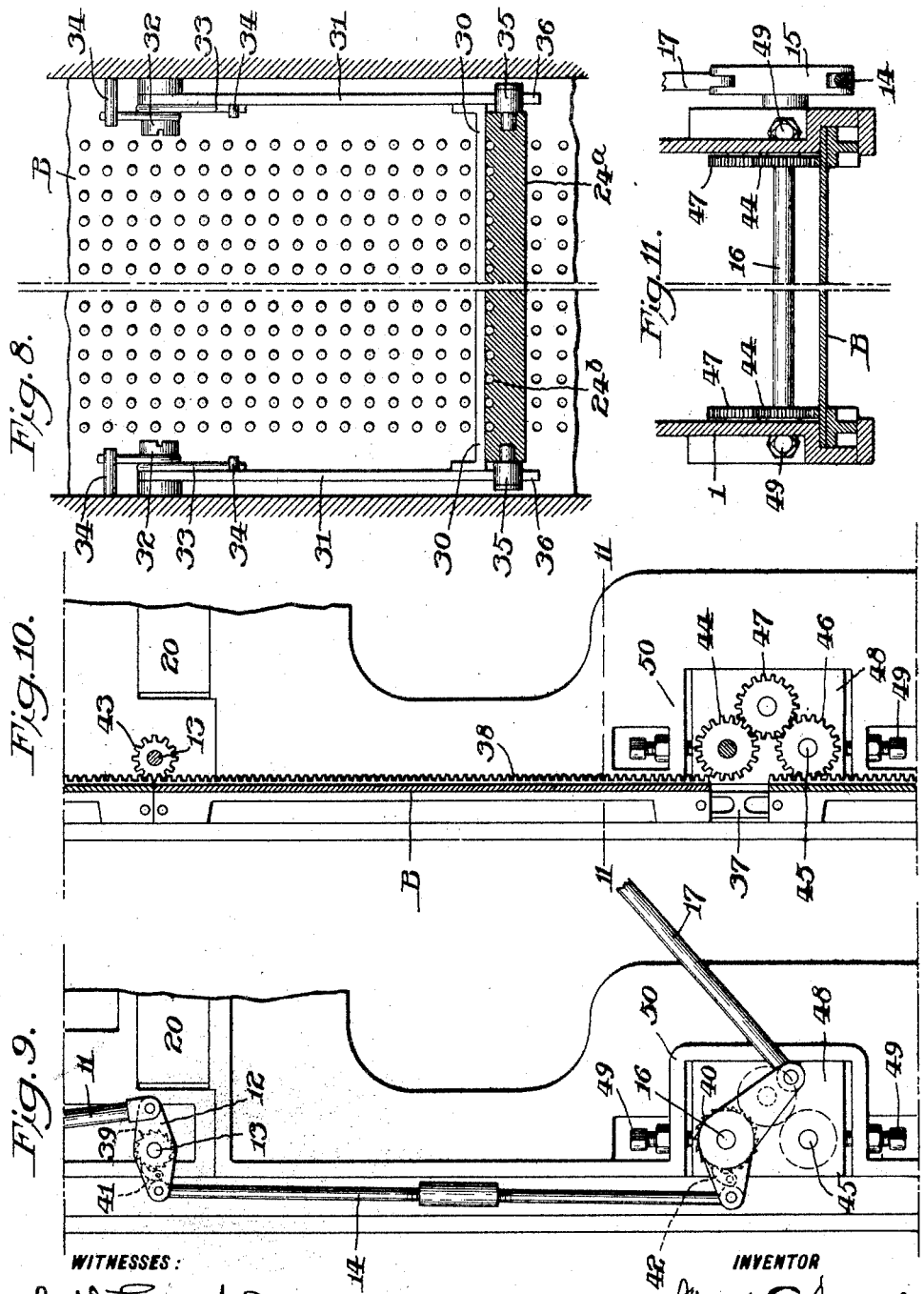

No. 776,648. Patented December 6, 1904.

UNITED STATES PATENT OFFICE.

JOSEPH C. DONNELLY, OF PHILADELPHIA, PENNSYLVANIA, ASSIGNOR TO DIAMOND MATCH COMPANY, OF NEW YORK, N. Y., A CORPORATION OF ILLINOIS.

MATCH-MAKING MACHINE.

SPECIFICATION forming part of Letters Patent No 776,648, dated December 6, 1904.

Original application filed April 7, 1900, Serial No. 11,919. Divided and this application filed April 25, 1903. Serial No. 154,234.

(No model.)

*To all whom it may concern:*

Be it known that I, JOSEPH C. DONNELLY, a citizen of the United States, and a resident of the city and county of Philadelphia and State of Pennsylvania, have invented certain new and useful Improvements in Match-Making Machines, of which the following is a specification.

This application is a division of an application for patent, Serial No. 11,919, filed by me April 7, 1900, for certain improvements in match-making machines.

The subject of the present application relates generally to the splint cutting and inserting mechanism and to the carrier and carrier-actuating mechanism of such machines, and has for its object to provide a simple, efficient, and durable construction and organization of parts whereby splints shall be rapidly and expeditiously cut and inserted row by row in the carrier and whereby such carrier shall be positively impelled in respect to the cutting and inserting mechanism in a manner to receive the splints in succeeding rows, as will be hereinafter described in detail, the novel features being defined in the claims.

In the drawings, Figure 1 is an elevation of a portion of a match-machine embodying my invention. Fig. 2 is a horizontal section as on the line 2 2 of Fig. 1, the splint cutting and inserting mechanism appearing in plan. Fig. 3 is an end elevation of that portion of Fig. 1 below the line 2 2. Fig. 4 is a detail of the hopper and the feed-roller therein. Figs. 5 and 6 are vertical sections, enlarged, through the hopper, the cutter-head, and the adjacent part of the carrier, showing the operation of the splint guiding and supporting device in the forward and retracted positions, respectively, of the said head. Fig. 7 is a detail of the studded bar for freeing the splints from the cutters. Fig. 8 is a vertical section as on the line 8 8 of Fig. 5. Fig. 9 is a detail, enlarged, of the pawl-and-ratchet mechanism for actuating the gearing for impelling the carrier. Fig. 10 is a vertical section through a part of the carrier, showing the said gearing. Fig. 11 is a transverse section as on the line 11 11 of Fig. 10.

A represents a mechanism for cutting the splints from a block and thrusting them row by row into a carrier B. This carrier is preferably, though not essentially, an endless carrier made up of perforated plates linked together and directed and guided throughout its course by suitably-arranged wheels, such as indicated at B'.

Referring to the splint cutting and inserting mechanism, 1 is a supporting-frame, 2 the driving-shaft, and 3 the hopper, by way of which the wood is fed to the cutters. The hopper comprises a box or casing set at a suitable angle in respect to the cutters and open on its under face in a plane parallel with the path of the cutters. The hopper is provided with a milled feed-roller 4, that takes against the opposing surface of the wood, the shaft of such roller being provided with a bevel-wheel 5, which gears with a corresponding wheel 6 on a stud-shaft 7, whereby when the latter is actuated the feed-roller is rotated in a manner to feed the stock toward the cutters. In the present instance the stud-shaft is provided with a ratchet-wheel 8, with which coacts a pawl 9 on a rock-frame 10 on the shaft 7. This frame is connected, by means of a link 11, with one arm of a rock-lever 12 on a stud-shaft 13, the outer arm of the lever being in turn connected by a link 14 with the shorter arm of a second rock-lever 15 on a stud-shaft 16. The longer arm of the latter lever is connected, by means of a pitman 17, with an eccentric 18 on the main shaft 2, to the end that when said shaft is driven the pawl 9 is reciprocated in a manner to rotate intermittently the ratchet-wheel 8 and its connections. The levers 12 and 15 in their oscillations are adapted to effect the actuation of certain devices which coact with the carrier B to impart an intermittent movement thereto, as will be hereinafter described.

20 is a cross-head reciprocable toward and from the carrier B in a horizontal path directly below the mouth of the feed-hopper.

This head is fitted to and guided in suitable ways in the supporting-frame and is actuated from the main shaft 2 through an eccentric 21 and pitman 22. On the forward end of this head is a cutter-bar, which in this instance comprises two sections 23 24, bolted together and to the reciprocative head by bolts 25. Between these sections the shanks of a row of cutters 26 are fitted, each cutter being adjustably held in place by means of a vertical screw-rod 27, which is fitted thereto and extended through the section 24, as shown. By manipulating this rod the cutter may be nicely adjusted vertically and retained in its position of adjustment. Section 24 is provided with a horizontal extension $24^a$, the upper face of which lies slightly below the heads of the cutters and is provided with a series of parallel grooves or pockets $24^b$ in line with the cutters, as seen. These cutters are so arranged in respect to the hopper that during the backward stroke of the head they will pass through the lower projecting portion of the block and sever a row of match-splints therefrom. On the lower outer edge of the hopper is secured, by screws 28 or other means, a bar 29, on the inner edge of which is formed a series of inwardly-projecting studs $29^a$, that are equal in number to the cutters and are directly in the path thereof, to the end that the cutters as they complete such backward stroke will surround the respective studs, and the latter, acting against the opposing ends of the rows of splints, will perforce permit the cutters to clear the same. The rows of splints thus severed and released will drop by gravity into the grooves or pockets in the underlying extension $24^a$ of the cutter-bar and adjacent to the shanks of the respective cutters, so that in the forward or reverse stroke of the cutter-head the row of splints thus supported will be thrust into a corresponding row of holes or receivers in the carrier by the impact of such shanks against the opposing ends of the cut splints. As a simple and efficient means whereby the splints are guided and supported against vertical displacement as they are thus being thrust into the carrier I provide a guide device, which is movable in respect to the grooved surface of the reciprocating member. This device in its preferred form comprises a transverse bar 30, carried by depending side bars 31, which are pivoted at their upper ends, as at 32, to the main frame. The device is maintained normally in the inclined position indicated in Fig. 6 by the action of suitable springs, as 33, each of which, encircling the pivots of the device, bears at its respective ends against studs 34 34 on the adjacent side bars and main frame, respectively. The bar 30 is so located that if during the forward movement of the cutter-head the bar be swung toward the vertical in opposition to the spring said bar will lie upon or adjacent the row of splints on the extension $24^a$, and thus serve in conjunction with the latter to guide and steady the cut splints as they are driven into the carrier. Studs 35, with or without antifriction-rollers, are arranged on the ends of the extension, so as to take against the depending ends 36 of the side bars during the forward stroke of the guide device. In the backward stroke of the cutter-head these studs are retracted from the guide device, and the latter in consequence resumes its normal position in readiness for a succeeding action. In this backward stroke the cutters sever a fresh row of splints from the block and the above-described operation is repeated, the splint-carrier being impelled step by step in time with the reciprocation of the cutter-head, so as to present a new row of holes (or receivers) to each succeeding row of splints as rapidly as it is produced.

As to the carrier herein illustrated it comprises a series of perforated plates flexibly connected at their adjoining ends by laterally-disposed links 37, whereby the plates may be independently moved toward and from each other within limits. The perforations in the respective plates are formed in equidistant parallel rows, the end rows thereof being so arranged in respect to the extremities of the plates that when two adjoining plates are brought end to end, or substantially so, the distance between the adjacent end rows of the respective plates is equal to that between adjacent rows in the body of the plate, and in consequence uniform interspaces between the rows of perforations in the adjoining plates are secured. The plates are thus moved together preliminary to their passage in front of the splint-inserting mechanism, so that the end rows of perforations in said plates will be brought successively into line with the uniformly-reciprocating splint-inserting mechanism similarly to the succeeding rows in the body of the plate. On the inner side of each of the plates near one of its lateral edges is a longitudinal rack-section 38, the end teeth whereof are so disposed that when two adjoining plates are brought together, as above stated, the continuity of the rack is preserved. Coacting with the rack is appropriate gearing by means of which the carrier is impelled and the plates thereof moved into and out of contact with and from each other at predetermined intervals. The gearing herein illustrated for this purpose is of the following construction: Affixed to the stud-shafts 13 16 are ratchet-wheels 39 and 40, respectively, with the teeth of which engage pawls 41 and 42 on the adjacent rock-levers 12 15, respectively, whereby during the operation of the latter the pawls intermittently rotate the respective ratchet-wheels and, perforce, the two stud-shafts. On these shafts are gears 43 44, respectively, which mesh with the adjacent rack-teeth, and thereby advance the latter and the adjoining plates step by step. Below the shaft 16 is a parallel shaft 45, carrying a gear-wheel 46, which also engages the teeth of the adjacent rack. The wheels 44 and 46 are geared together by an interposed idler 47, and thereby concertedly driven at a corresponding rate of speed, the space between such wheels 44 and 46 being sufficient to span that between two adjoining plates, and thus insure the engagement of the rack of the lower plate by the wheel 46 before the disengagement of the rack of the upper plate from the companion wheel 44. The wheel 43 is driven at the same rate of speed as the two lower wheels just referred to, but is of smaller diameter, and hence the racks when engaged by such wheel 43 are moved at a slower speed than when they are engaged by the two lower wheels 44 46. The wheel 43 is so disposed in respect to the others that it engages each rack just as the lower end of the latter escapes the wheel 44, and therefore as the speed of such rack is reduced the lower adjoining rack is moved into contact therewith for the purpose intended. The shafts 16 45 have their bearings in a block 48, which may be adjusted as desired in respect to the carrier by means of set-screws 49, fitted in the walls of the housings 50, in which the blocks are mounted.

One (or more) of the wheels B' adjacent to the sticking mechanism is provided with suitably-spaced studs or teeth 51, which engage the spaces between adjoining plates of the carrier. This wheel is positively driven at a proper rate of speed to effect the separation or spacing of the plates when they are disengaged from the retarding-gear 43, to the end that such plates may be flexed as they round the wheels. To this end the shaft of said wheel is provided with a worm-wheel 52, with which coacts a worm 53 on the upper end of a vertical shaft 54, the lower end of the latter shaft being provided with a bevel-wheel 55, which gears with and is driven by a similar wheel 56 on a horizontal driving-shaft 57. This shaft 57 is actuated from the main driving-shaft through the medium of a vertical shaft 58, carrying at its respective ends bevel-wheels 59, which gear with corresponding wheels 60 on the ends of the shafts 2 57, respectively.

While I have herein shown and described a preferred embodiment of my improvements, it is to be understood that I do not confine myself strictly thereto, as obviously the mechanisms may be modified without departing from the fair spirit of the invention.

I claim—

1. The combination of a splint-carrier, a head reciprocative horizontally toward and from the carrier bearing a row of splint-cutters, means whereby stock is supplied to said cutters, and means whereby the splints are freed from said cutters at the end of the cutting stroke, the said head being provided with a splint-supporting surface below the horizontal plane of the splints thus freed, whereby such splints drop in parallelism upon said head in position to be inserted thereby in the carrier.

2. The combination of a splint-carrier, a head reciprocative horizontally toward and from the carrier carrying a row of splint-cutters, means whereby stock is supplied to said cutters, and means whereby the splints are freed from said cutters at the end of the cutting stroke, the said head being provided with a splint-supporting surface below the horizontal plane of the splints thus freed, whereby such splints drop in parallelism upon said head in position to be inserted thereby in the carrier, together with a movable guide device for the upper portions of the splints as they are being directed to the carrier.

3. The combination of a splint-carrier, a head reciprocative horizontally toward and from the carrier, a row of splint-cutters on said head having depending shanks, means for feeding stock to said cutters, means whereby the splints are freed from said cutters at the end of the cutting stroke, the said head being provided with a splint-supporting surface below the horizontal plane of the splints thus freed, whereby such splints drop in parallelism upon said head with their rearward ends adjacent the shanks of the cutters, and whereby such shanks serve as abutments for the opposing ends of the splints.

4. The combination of a splint-carrier, a head reciprocative horizontally toward and from the carrier, a row of splint-cutters on said head having depending shanks, means for feeding stock to said cutters, means whereby the splints are freed from said cutters at the end of the cutting stroke, the said head being provided with a splint-supporting surface below the horizontal plane of the splints thus freed, whereby such splints drop in parallelism upon said head with their rearward ends adjacent the shanks of the cutters, and whereby such shanks serve as abutments for the opposing ends of the splints, together with the movable guide device for the upper sides of the splints on said head.

5. The combination with a splint-carrier, of a splint-feeding head reciprocative toward and from the carrier, an oscillatory guide device for the splints on said device, and means whereby said head is caused to swing in respect to said head during the reciprocation of the latter.

6. The combination with a splint-carrier, of a splint-feeding head reciprocative toward and from the same, an oscillatory guide device for the splints movable toward and from the splint-bearing surface of said head, a spring to maintain said device normally retracted from such surface, and means whereby said device is moved in opposition to the spring during the stroke of the head toward the carrier.

7. The combination of a splint-carrier, a head reciprocative toward and from the carrier for inserting splints in the latter, a splint-guide device movable at one time toward the carrier and the splint-bearing surface of the head, and at another time away from said carrier and surface, and means whereby said device is actuated during the reciprocation of the head.

8. The combination with a splint-carrier, means for cutting and freeing splints, a reciprocating support upon which the freed splints are seated in parallelism with each other and at right angles to the carrier, an oscillatory guide device for the splints, and means whereby said device is caused to swing in respect to said support during the reciprocation of the latter.

9. The combination of a splint-carrier, means for cutting and freeing splints, a reciprocating support upon which the freed splints are seated in parallelism with each other and at right angles to the carrier, an oscillatory guide device for the splints movable toward and from the splint-bearing surface of said support, a spring to maintain said frame normally retracted from such surface, and means whereby said device is moved in opposition to the spring during the stroke of the support toward the carrier.

10. In a match-making machine, the combination with a carrier embodying a series of connected members whereof the connections permit relative independent longitudinal movements of the members, of means for intermittently moving said members at one rate of speed during a portion of their traverse, and means for intermittently moving said members at a slower rate of speed at another portion of their traverse.

11. In a match-making machine, the combination with a source of splint-supply, of a carrier embodying a series of connected members whereof the connections permit relative independent longitudinal movement of the members, means for intermittently moving said members at one rate of speed, and means for intermittently moving said sections at a slower rate of speed, or substantially so, as they approach the source of splint-supply.

Signed at Philadelphia, in the county of Philadelphia and State of Pennsylvania, this 17th day of April, A. D. 1903.

JOSEPH C. DONNELLY.

Witnesses:
  HUBERT S. WILLIAMS,
  ANDREW V. GROUPE.